US010120666B2

(12) United States Patent
Doyle et al.

(10) Patent No.: US 10,120,666 B2
(45) Date of Patent: *Nov. 6, 2018

(54) CONDITIONAL BRANCH INSTRUCTION COMPACTION FOR REGIONAL CODE SIZE REDUCTION

(71) Applicant: International Business Machines Corporation, Armonk, NY (US)

(72) Inventors: Patrick R. Doyle, Toronto (CA); Vijay Sundaresan, North York (CA)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/047,161

(22) Filed: Feb. 18, 2016

(65) Prior Publication Data

US 2016/0162296 A1 Jun. 9, 2016

Related U.S. Application Data

(63) Continuation of application No. 14/314,065, filed on Jun. 25, 2014, now Pat. No. 9,298,436.

(51) Int. Cl.
G06F 9/30 (2018.01)
G06F 8/40 (2018.01)
(Continued)

(52) U.S. Cl.
CPC .......... *G06F 8/4442* (2013.01); *G06F 8/4434* (2013.01); *G06F 9/30145* (2013.01);
(Continued)

(58) Field of Classification Search
CPC ....... G06F 8/44–8/52; G06F 9/3005–9/30061; G06F 11/30–11/3495; G06F 9/30145; G06F 9/300181
(Continued)

(56) References Cited

U.S. PATENT DOCUMENTS 5,212,794 A 5/1993 Pettis et al.
5,740,447 A 4/1998 Kurahashi
(Continued)

OTHER PUBLICATIONS

Sidwell, N., "Long and Short Jumps", GNU.org [online], 2004 [retreved Dec. 18, 2016], Retrieved from Internet: <URL: http://gcc.gnu.org/ml/gcc/2004-05/msg01118.html>, pp. 1-2.*

(Continued)

Primary Examiner — Todd Aguilera
(74) Attorney, Agent, or Firm — Isaac J. Gooshaw

(57) ABSTRACT

In an approach for decreasing an execution time of a computer code, one or more processors identify a long-form conditional branch that is included in a first region of a computer code. The one or more processors generate a long-form unconditional branch with a target that is a target of a long-form conditional branch. The one or more processors modify the long-form conditional branch to be a short-form conditional branch. The one or more processors insert the long-form unconditional branch into the computer code within a branch distance of the short-form conditional branch. The one or more processors modify a target of the short-form conditional branch to be a location of the long-form unconditional branch in the computer code.

17 Claims, 6 Drawing Sheets

(51) Int. Cl.
*G06F 11/34* (2006.01)
*G06F 8/41* (2018.01)

(52) U.S. Cl.
CPC ...... *G06F 9/30181* (2013.01); *G06F 11/3466* (2013.01); *G06F 9/30054* (2013.01); *G06F 9/30058* (2013.01)

(58) Field of Classification Search
USPC .................. 717/127–161; 712/233–240; 714/38.1–38.14
See application file for complete search history.

(56) References Cited

U.S. PATENT DOCUMENTS

| | | | | |
|---|---|---|---|---|
| 5,784,605 | A * | 7/1998 | Ando | G06F 9/44521 712/238 |
| 5,896,538 | A * | 4/1999 | Blandy | G06F 11/3409 714/E11.192 |
| 5,940,622 | A * | 8/1999 | Patel | G06F 8/443 717/158 |
| 6,145,125 | A | 11/2000 | Civlin et al. | |
| 6,327,704 | B1 * | 12/2001 | Mattson, Jr. | G06F 9/45516 712/234 |
| 6,367,076 | B1 * | 4/2002 | Imai | G06F 8/447 712/206 |
| 6,928,641 | B1 | 8/2005 | Szewerenko et al. | |
| 7,299,369 | B2 | 11/2007 | Webster et al. | |
| 7,735,074 | B2 | 6/2010 | Lobo et al. | |
| 8,359,435 | B2 | 1/2013 | Erez et al. | |
| 8,489,866 | B2 | 7/2013 | Mestan et al. | |
| 8,516,230 | B2 | 8/2013 | Chen et al. | |
| 8,522,225 | B2 | 8/2013 | Chen et al. | |
| 9,298,436 | B2 * | 3/2016 | Doyle | G06F 8/4442 |
| 2005/0229017 | A1 | 10/2005 | Webster et al. | |

OTHER PUBLICATIONS

Zhang, K., "Binary Translation to Improve Energy Efficiency through Post-pass Register Re-allocation", Proceedings of the 4th ACM International Conference on Embedded Software [online], 2004 [retrieved Feb. 17, 2016], Retrieved from the Internet: <URL: https://pdfs.semanticscholar.org/f4cb/aaf6ffda2f38859ae69367bbd110f81abfd4.pdf>, pp. 74-85.*

Anonymous, Table of Branch Instructions, Central Connecticut State University [online], 2010 [retrieved Jan. 25, 2018], Retrieved from Internet: <URL: https://web.archive.org/web/20100421062358/http://chortle.ccsu.edu/assemblytutorial/Chapter-24/ass24_4.html>, pp. 1-2.*

Hagersten et al., "Low Overhead Instruction—Cache Modeling Using Instruction Reuse Profiles", 2012 IEEE 24th International Symposium on Computer Architecture and High Performance Computing, Copyright 2012 IEEE, DOI 10.1109/SBAC-PAD .2012.25.

U.S. Appl. No. 14/314,065, entitled "Conditional Branch Instruction Compaction for Regional Code Size Reduction", filed Jun. 25, 2014.

Anonymous, "Programme Control Instructions", Dublin Institute of Technology School of Electronic and Communications Engineering [online], 2014 [retrieved Aug. 23, 2015], Retrieved from Internet <URL: https://web.archive.org/web/20130411070757/http://www.electronics.dit.ie/staff/tscarff/program_control/program_control.htm>, pp. 1-3.

List of IBM Patents or Patent Applications Treated as Related. Filed Mar. 3, 2017. 2 pages.

Matthews, David C.J., "The Poly and ML System: Abstract Machine and Realisation", University of Edinburgh, Laboratory for Foundations of Computer Science, Jul. 5, 1995, pp. 1-11, <www.lfcs.inf.ed.ac.uk/reports/95/ECS-LFCS-95-335/ECS-LFCS-95-335-4b.ps>.

* cited by examiner

CONDITIONAL BRANCH INSTRUCTION COMPACTION FOR REGIONAL CODE SIZE REDUCTION

BACKGROUND OF THE INVENTION

The present invention relates generally to the field of compiler optimizations and more specifically to the enhancement of computer performance by decreasing the size of instruction code in frequently executed regions of code.

Buffers and caches are often used in computing systems to temporarily hold items that are frequently accessed or whose access time may otherwise inhibit performance. Since buffers and caches have limited size, techniques used to efficiently utilize their limited space strongly influence their performance. A cache is a small, fast memory close to a processor that contains information that has been recently accessed or is near information that has been recently accessed in the expectation that the accessed information and nearby information will be accessed in the near future. An instruction cache contains instructions, and a data cache contains data. If an item a processor needs is in a cache, the item can be accessed faster than if the item is in main memory or elsewhere, thus enhancing a processor's performance on a code. An efficiency of a cache depends on the nature of a code being executed and the number of items the cache contains.

Branch instructions in an instruction set architecture are usually of two varieties, a conditional branch and an unconditional branch. An unconditional branch causes a locus of control in a processor to jump from the execution of the unconditional branch to the instruction at the address of the target of the branch. An unconditional branch instruction is often termed a jump instruction. A conditional branch tests a condition in a processor that has been set during an execution of a preceding instruction to determine whether to "take the branch" and cause a locus of control to transfer to an instruction that does not immediately follow the branch, the "target", or alternatively to "fall through the branch" and execute the instruction that immediately follows the conditional branch.

An instruction set architecture usually includes two types of conditional branch instructions, a "short-form" conditional branch that is a few bytes in length and has room for a few bits with which to encode a target's address, and is therefore limited to branch to a nearby target whose relative address can be encoded in the few bits, or a longer "long-form" conditional branch, with more bits available to encode a target's relative address, enabling a branch to an address of a target that is much farther away. A relative address is a quantity that is embedded in a conditional branch instruction that is added to the memory address of the conditional branch during the execution of a taken conditional branch to create an address of a target. A short-form conditional branch consumes less space in main memory and in an instruction cache (i-cache) enabling an i-cache of a given size to hold more instructions and therefore, be more efficient. Short-form conditional branches are used by a compiler when possible. If a target of a conditional branch is too distant from the conditional branch for a short-form conditional branch to be used, a long-form conditional branch is used.

SUMMARY

Embodiments of the present invention provide a method, system, and program product to decrease an execution time of a computer code. One or more processors identify a long-form conditional branch that is included in a first region of a computer code. The one or more processors generate a long-form unconditional branch with a target that is a target of a long-form conditional branch. The one or more processors modify the long-form conditional branch to be a short-form conditional branch. The one or more processors insert the long-form unconditional branch into the computer code within a branch distance of the short-form conditional branch. The one or more processors modify a target of the short-form conditional branch to be a location of the long-form unconditional branch in the computer code.

DETAILED DESCRIPTION

Embodiments of the present invention recognize that it is usually advantageous to decrease the code size of a heavily executed region of code at the expense of a region of code that is executed infrequently, as an overall performance enhancement of the code is consequently accrued. Techniques to decrease the code size of frequently executed regions of code are an active area of research as they may significantly enhance the performance of a computer code.

Figure 1:
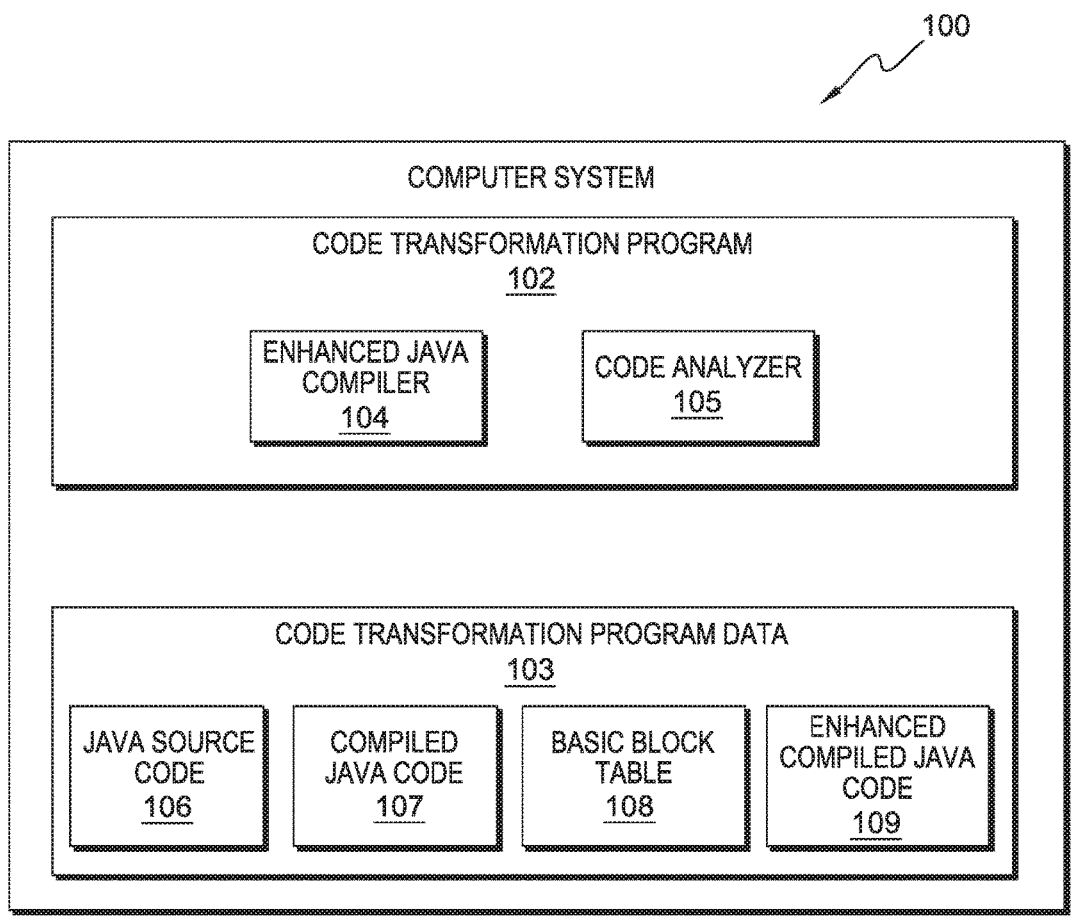
FIG. 1 is a block diagram of a computer system, in accordance with an embodiment of the present invention.

The present invention will now be described in detail with reference to the Figures. FIG. 1 depicts computer system 100 on which code transformation program 102 executes. Code transformation program 102 compiles and transforms a code by manipulating branch instructions into a code that may enhance the execution of the code. In an embodiment, computer system 100 is a workstation computing system. In other embodiments, computer system 100 may be a desktop computer, a laptop computer, a tablet computer, a personal digital assistant (PDA), or a distributed computing system. Computer system 100 may have components depicted in FIG. 6 and in general, may be any computing device capable of executing stored programs.

In an embodiment, code transformation program 102 writes to and reads from code transformation program data 103 during an execution of code transformation program 102. Code transformation program 102 includes enhanced JAVA compiler 104 and code analyzer 105. Code transformation program data 103 contains files JAVA source code 106, compiled JAVA code 107, basic block table 108, and enhanced compiled JAVA code 109. In an exemplary embodiment, enhanced JAVA compiler 104 in code transformation program 102 accesses and compiles JAVA source code 106 in Code transformation program data 103 to produce compiled JAVA code 107. Code analyzer 105 in code transformation program 102 accesses compiled JAVA code 107 in Code transformation program data 103 and analyzes compiled JAVA code 107. Code analyzer 105 identifies each basic block and a location of each basic block in compiled JAVA code 107, and for each basic block, specifies whether the basic block is expected to be executed frequently, infrequently, or with average frequency relative to other basic blocks in compiled JAVA code 107. In an embodiment, code analyzer 105 estimates a frequency of execution of a basic block by analyzing the function of the code in the basic block. In other embodiments, code analyzer 105 executes a code and monitors a frequency of execution of each basic block in the code. Code analyzer 105 records a result of the analysis of compiled JAVA code 107 in basic block table 108 in code transformation program data 103.

A basic block is a sequence of instructions that has only one entry point and only one exit point, which means that a basic block can only be branched into at the entry point or branched out of at the exit point. A term block and a term basic block are used interchangeably in this description of embodiments of the present invention. Enhanced JAVA compiler 104 also generates a control flow graph of JAVA source code 106, which is a graph of basic blocks that are connected with arrows denoting paths of control flow.

A long-form conditional branch is often 32-bits or 64-bits in length in RISC instruction sets and somewhat shorter in other instruction sets and can include a relatively long address field that encodes a target address, an address to which control flow transfers if the branch is taken. The relatively long address field enables the long-form conditional branch to transfer control to an instruction at an address that is relatively distant from a location of the branch. However, the longer length of the long-form conditional branch consumes more space in an instruction cache than is consumed by a shorter version of a conditional branch called a short-form conditional branch; thus, decreasing the number of instructions that can be stored in the instruction cache, resulting in a decreased hit ratio for the instruction cache. A decreased hit ratio for the instruction cache will result in increased execution time and decreased performance. A short-form conditional branch is often 16-bits in length and consumes less space in an instruction cache relative to a long-form conditional branch; therefore, enhancing an effectiveness of the instruction cache. Because an address field in a short-form conditional branch is short compared to that of a long-form conditional branch, a short-form conditional branch is limited to transfer control to an instruction at an address that is not as distant from an address of the branch compared to a distance that a long-form conditional branch is capable of.

Enhanced JAVA compiler 104 queries basic block table 108 while analyzing the control flow graph of JAVA source code 106. Using basic block table 108 to identify basic blocks found in JAVA source code 106 and a relative execution frequency of a basic block, enhanced JAVA compiler 104 looks for a long-form conditional branch at an exit point of a frequently executed basic block that branches to an entry point of a frequently executed basic block, called a candidate branch. If enhanced JAVA compiler 104 finds a candidate branch, enhanced JAVA compiler 104 converts the candidate branch to a short-form conditional branch that branches to a nearby unconditional branch called a trampoline, which in turn branches to a target that was a target of the long-form conditional branch and inserts the trampoline. After transforming and enhancing compiled JAVA code 107, enhanced JAVA compiler 104 stores the resulting code in enhanced compiled JAVA code 109 in code transformation program data 103. An example process of converting a long-form conditional branch that is a candidate branch to a short-form conditional branch is illustrated in FIGS. 2, 3, and 4.

Figure 2:
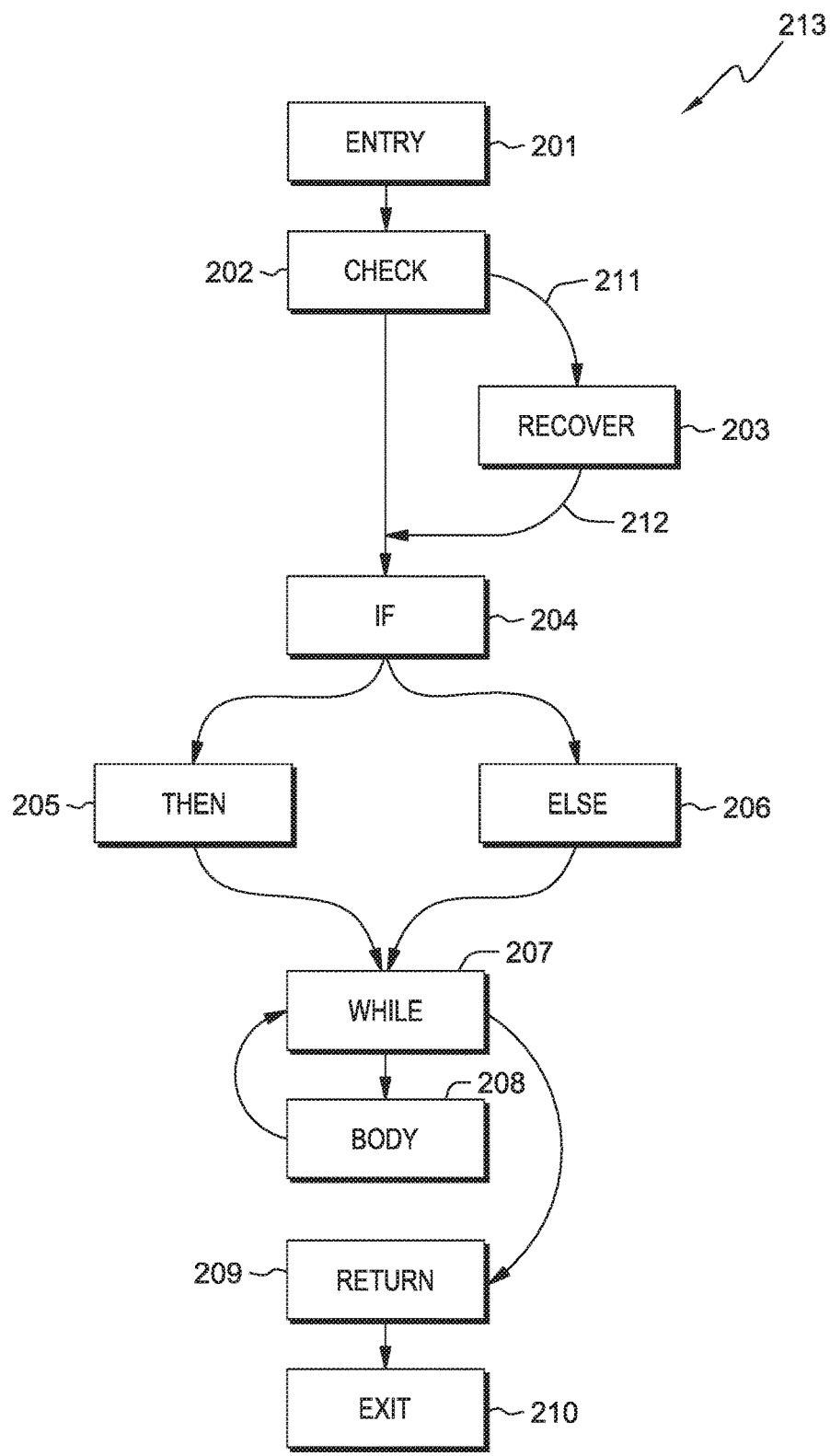
FIG. 2 depicts a control flow graph of a code, in accordance with an embodiment of the present invention.

FIG. 2 depicts control flow graph 213 that includes basic blocks 201, 203, 204, 205, 206, 207, 208, 209, and 210. Control flow graph 213 is a control flow graph of an example code, JAVA source code 106, created by enhanced JAVA compiler 104. Entry block 201 and exit block 210 are dummy blocks that help an analysis by enhanced JAVA compiler 104. Control flow graph 213 is entered through entry block 201 which transfers control to check block 202. A code in check block 202 checks if a code in JAVA source code 106 is performing correctly and is found to be frequently executed by code analyzer 105. If the code is performing correctly, check block 202 passes control to if block 204 and otherwise passes control to recover block 203 via control flow transfer 211. Recover block 203 contains code that manages the code in JAVA source code 106 that is performing incorrectly and passes control to if block 204 via control flow transfer 212. In JAVA, two examples of a code that performs incorrectly is an array index that is out of bounds or an exhausted thread-local heap which is a non-garbage collected chunk of memory that a thread can allocate to store data. If block 204 executes code that tests a condition and passes control to then block 205 or to else block 206 depending on whether or not the condition is met. Both then block 205 and else block 206 execute a code and pass control to while block 207. While block 207 executes a code that tests a condition, and if the condition is met, passes control to body block 208 which executes a code and passes control back to while block 207. If the condition is not met, while block 207 passes control to return block 209, which executes a code and exits control flow graph 213 via exit block 210.

Figure 3:
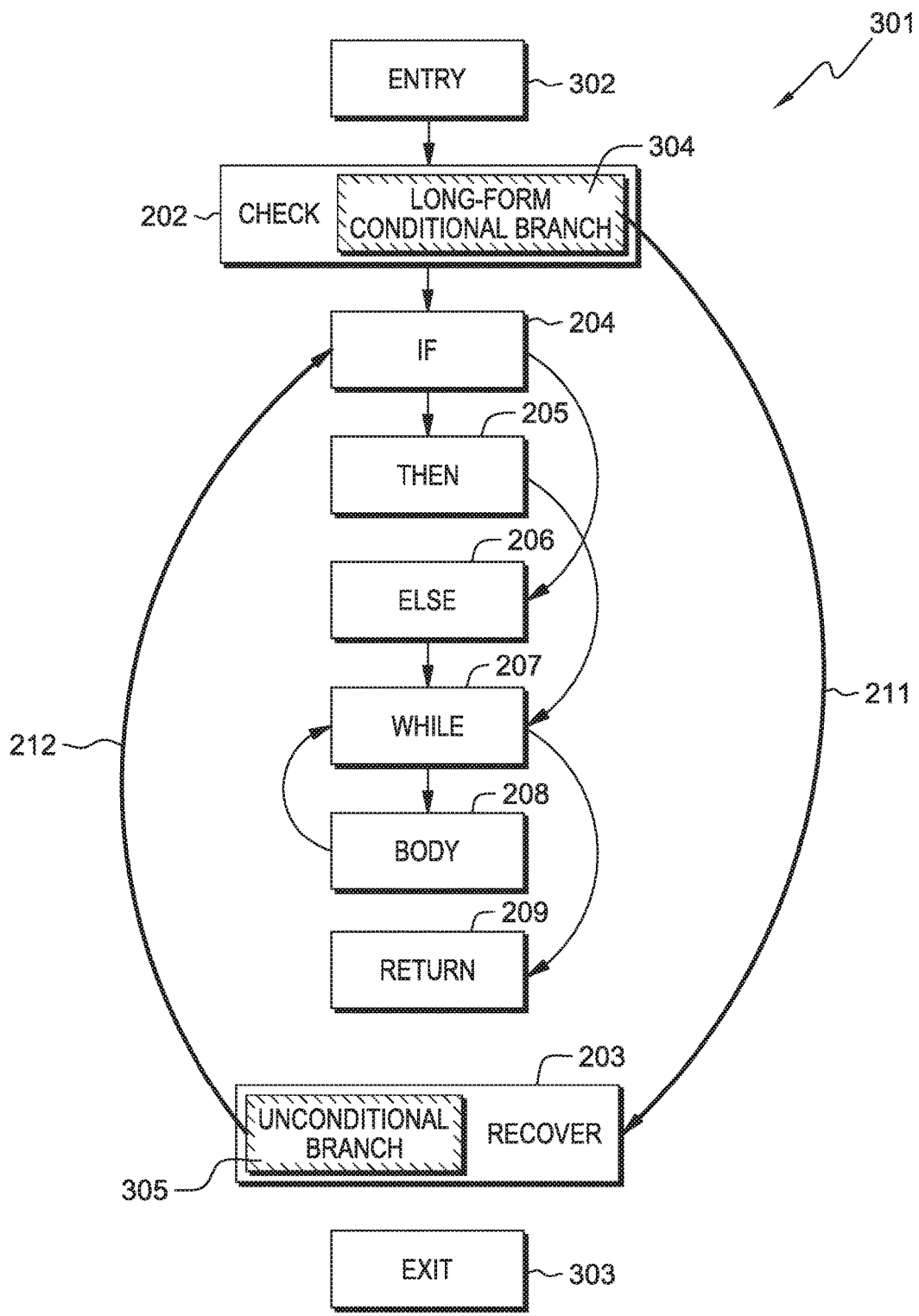
FIG. 3 depicts a sequence of basic blocks of the code in FIG. 2, arranged in a sequence in an address space, in accordance with an embodiment of the present invention.
Figure 4:
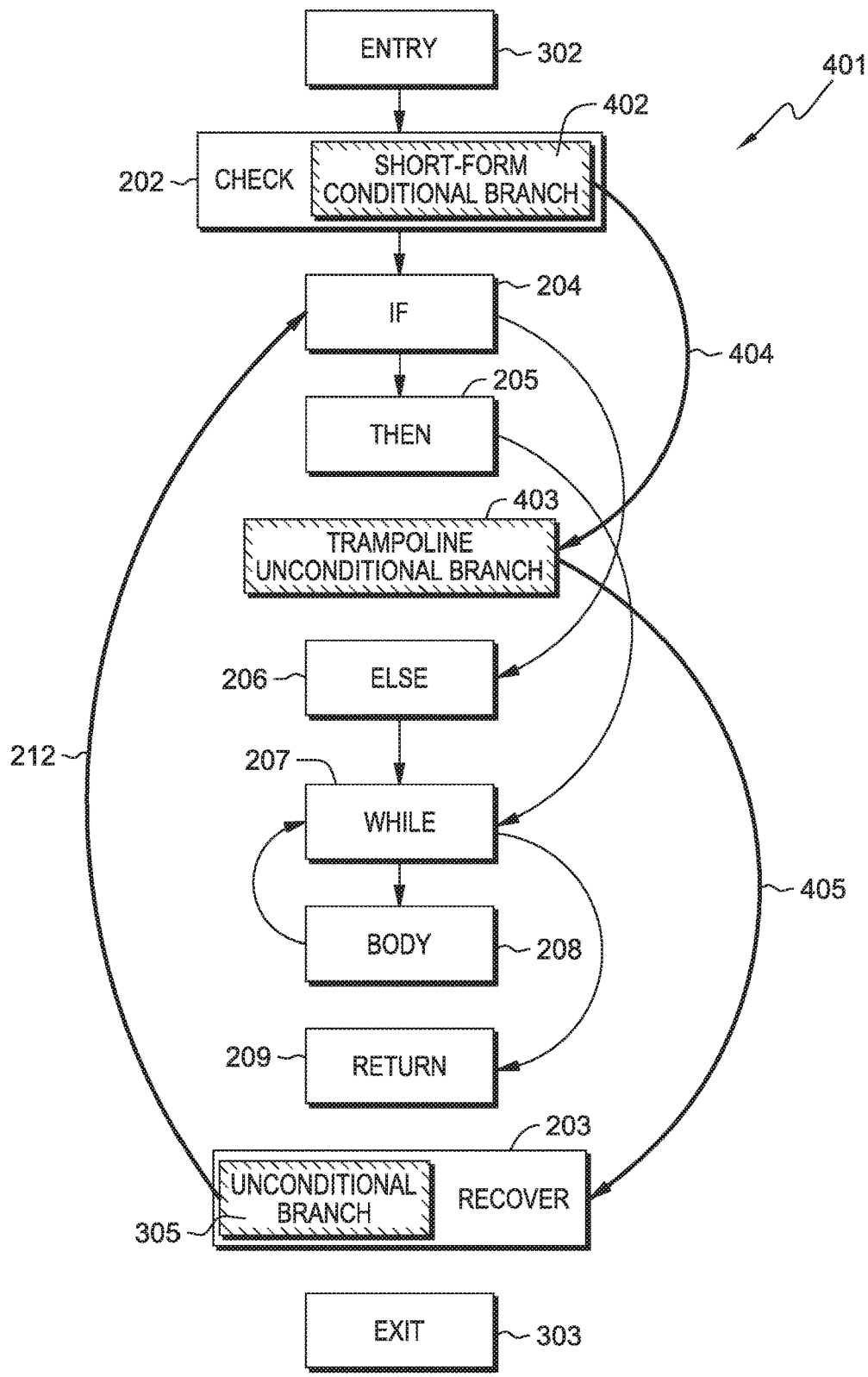
FIG. 4 depicts a sequence of basic blocks of a transformation of the code in FIG. 2, arranged in a sequence in an address space, in accordance with an embodiment of the present invention.

FIG. 3 depicts basic block sequence 301, which is comprised of basic blocks 302, 202, 204, 205, 206, 207, 208, 209, 203, and 303 that enhanced JAVA compiler 104 has arranged in a sequence in an address space, in accordance with an embodiment of the present invention. Entry block 302 and end block 303 contain no code and are dummy blocks that help an analysis of basic block sequence 301. Because recover block 203 is far from check block 202 in an address space, enhanced JAVA compiler 104 implements control flow transfer 211 with long-form conditional branch 304, and enhanced JAVA compiler 104 implements control flow transfer 212 with unconditional branch 305.

In an embodiment, code analyzer 105 performs an analysis on basic block sequence 301, which includes an estimation of a location of basic blocks 202, 204, 205, 206, 207, 208, 209, and 203 and an estimation of a frequency of execution for each basic block. During the analysis, code analyzer 105 determined that check block 202 is likely to be executed relatively frequently and that recover block 203 is likely to be executed relatively infrequently and recorded a result of the analysis in basic block table 108.

In an embodiment, enhanced JAVA compiler 104 reexamines basic block sequence 301 while accessing the information in basic block table 108 on a basic block in basic block sequence 301 and finds long-form conditional branch 304 in frequently executed check block 202 that transfers control to relatively infrequently executed recover block 203. To enhance performance, enhanced JAVA compiler 104 converts basic block sequence 301 to enhanced basic block sequence 401 depicted in FIG. 4.

FIG. 4 depicts the result after enhanced JAVA compiler 104 has transformed basic block sequence 301 to an enhanced basic block sequence, enhanced basic block sequence 401. To decrease a size of frequently executed code and thus increase a hit ratio of an instruction cache, enhanced JAVA compiler 104 converts long-form conditional branch 304 to short-form conditional branch 402 and inserts trampoline unconditional branch 403 into basic block sequence 301 as an instruction near short-form conditional branch 402 to which short-form conditional branch 402 transfers control. A relative address in short-form conditional branch 402 is short and cannot reach recover block 203. Enhanced JAVA compiler 104 partitions control flow transfer 211 from check block 202 to recover block 203 into two control flow transfers, a first control flow transfer 404 from check block 202 to trampoline unconditional branch 403, and a second control flow transfer 405 from trampoline unconditional branch 403 to recover block 203.

Enhanced JAVA compiler 104 inserts trampoline unconditional branch 403 at a location immediately after then block 205 and immediately prior to else block 206 because the location does not interrupt a flow of control and therefore, no additional branches around trampoline unconditional branch 403 are necessary.

Figure 5:
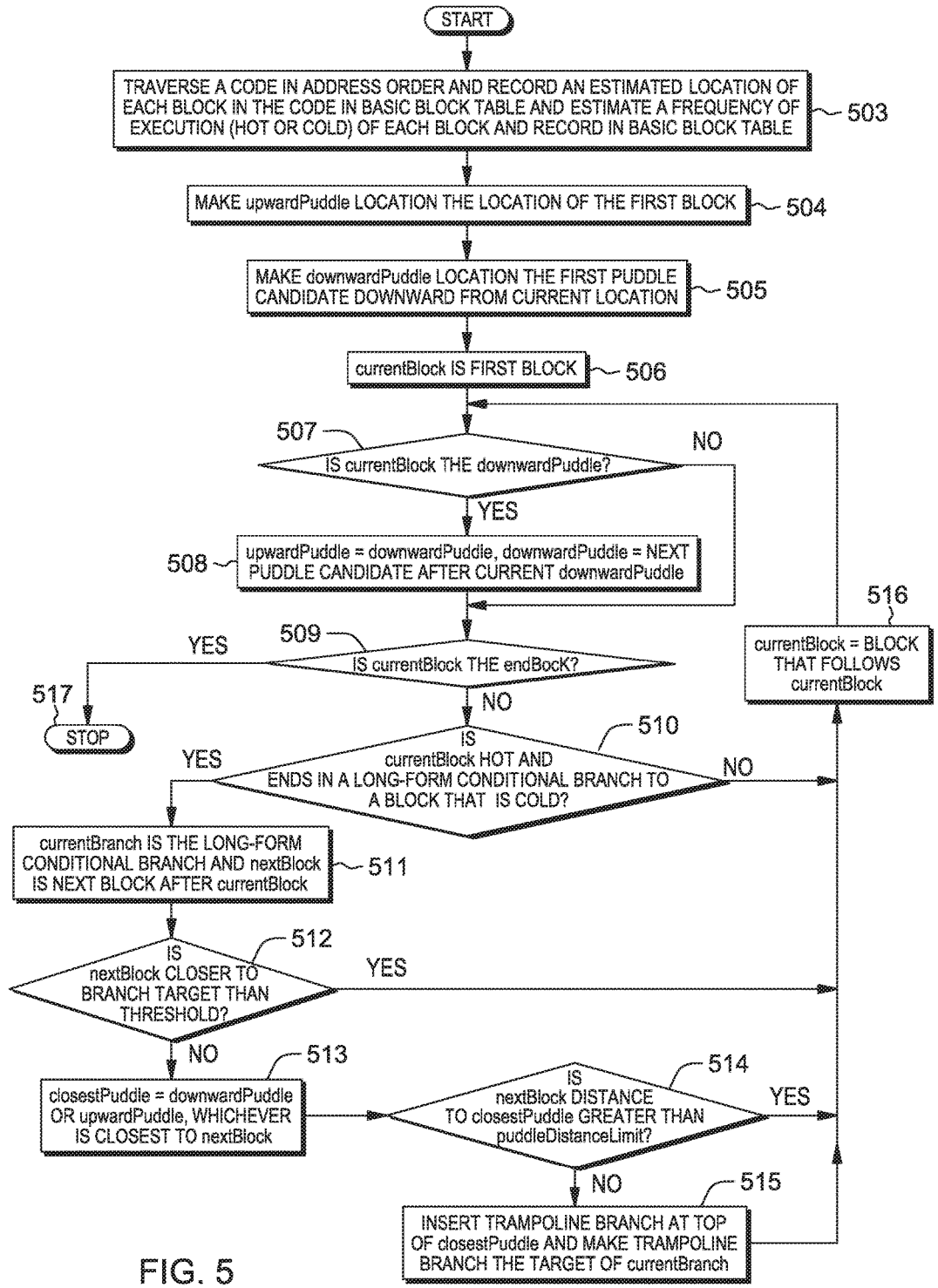
FIG. 5 is a flowchart depicting operational steps of a code transformation program, in accordance with an embodiment of the present invention.

FIG. 5 depicts the operational steps followed a conversion of compiled JAVA code 107 into enhanced compiled JAVA code 109, in an embodiment. The flowchart depicted in FIG. 5 is a sequence of steps that are followed by enhanced JAVA compiler 104 and code analyzer 105 to locate and convert a long-form conditional branch in frequently executed code, which branches to infrequently executed code, into a short-form conditional branch that branches to a trampoline unconditional branch that is inserted into a location called a puddle. A puddle is a group of one or more consecutive trampoline unconditional branches that serve as targets for one or more short-form conditional branches that replace one or more long-form unconditional branches. Three locations, a location of each of three blocks, are manipulated in an algorithm depicted in flowchart 501, a location of an upwardPuddle block, a location of a currentBlock, and a location of a downwardPuddle block. The upwardPuddle block location and the downwardPuddle block location are two candidate locations for a puddle if an insertion of the puddle is necessary. The puddle is necessary if a block at the currentBlock location is found to be frequently executed, termed HOT, and contains a long-form conditional branch that transfers control to an infrequently executed block, termed COLD.

In an embodiment, an ideal candidate location for a puddle is a location immediately following a basic block that cannot transfer control, or fall through, to the puddle often because the last instruction in the basic block is an unconditional branch. For example, then block 205 in basic block sequence 301 is such a block. Therefore, a trampoline unconditional branch that is located in a puddle that immediately follows the basic block can be reached only as a target of a branch and does not need to be branched around as would otherwise be the case. For example, trampoline unconditional branch 403 is located immediately following then block 205 in enhanced basic block sequence 401. A location of upwardPuddle, in the direction preceding a current location, and the location of downwardPuddle, in the direction of the current direction, are altered during a process to provide two candidate locations for an insertion of a puddle. When a puddle is needed, the puddle is inserted in either the upwardPuddle location or the downwardPuddle location, whichever location is closest to the current location.

Flowchart 501 begins with an analysis of compiled JAVA code 107. In a first pass through, compiled JAVA code 107, code analyzer 105 traverses the code in address order, locates one or more basic blocks, estimates how frequently each of the one or more basic blocks is executed, and inserts an estimated starting location and estimated execution frequency of each of the one or more basic blocks into basic block table 108 (step 503). Enhanced JAVA compiler 104 begins to examine basic blocks recorded in basic block table 108 in location order and designates a location of the upwardPuddle as a location of a first block (step 504). Enhanced JAVA compiler 104 finds a first puddle candidate location that follows the location of the first basic block and makes the downwardPuddle location the first puddle candidate location (step 505).

A location of currentBlock is made the location of the first block (step 506). If currentBlock location and downwardPuddle location are the same (decision step 507), the upwardPuddle location is made the downwardPuddle location and the downwardPuddle location is made the location of the next puddle candidate following the downwardPuddle (step 508). A next step is decision step 509. If, in step 507, currentBlock location and downwardPuddle location are not the same (decision step 507), a next step is decision step 509.

If in decision step 509, currentBlock location is the same as a location of a last block in a code examined, endBlock, an analysis of a code in flowchart 501 terminates (step 517), and if currentBlock location is not the same as a location of a last block in a code examined, a next step is decision step 510. If in decision step 510, currentBlock is HOT and currentBlock ends in a long-form conditional branch to a block that is COLD, a next step is step 511, otherwise a next step is step 516.

CurrentBranch location is made a location of the long-form conditional branch at an end of currentBlock, and a location of nextBlock is a location of a next block after currentBlock (step 511), and decision step 512 follows step 511. A threshold is the distance limit set by the maximum branching distance of a short-form conditional branch instruction. When a target of a long-form conditional branch is less that the threshold distance from the long-form conditional branch, the long-form conditional branch is replaced with a short-form conditional branch that transfers control to the target of the long-form conditional branch.

If in decision step 512, a nextBlock location is closer to a target of the long-form conditional branch than the threshold, a next step is step 516, and otherwise a next step is step 513. In step 513, a location of closestPuddle is set to a location of downwardPuddle or a location of upwardPuddle, whichever is closest to a location of nextBlock. If a location of nextBlock is farther away from a location of closestPuddle than puddleDistanceLimit (decision step 514), step 516 follows decision step 514, otherwise step 515 follows decision step 514.

A trampoline branch is inserted at a top of closestPuddle and made the target of currentBranch (step 515). For example, trampoline unconditional branch 403, a currentBranch during a conversion of compiled JAVA code 107 into enhanced compiled JAVA code 109, is made a target of short-form conditional branch 402 and is inserted at a top of a closestPuddle that followed then block 205 in FIG. 4. Short-form conditional branch 402 replaced long-form conditional branch 304. A location of currentBlock is set to a location of a block that immediately follows currentBlock (step 516), and decision step 507 follows step 516.

Figure 6:
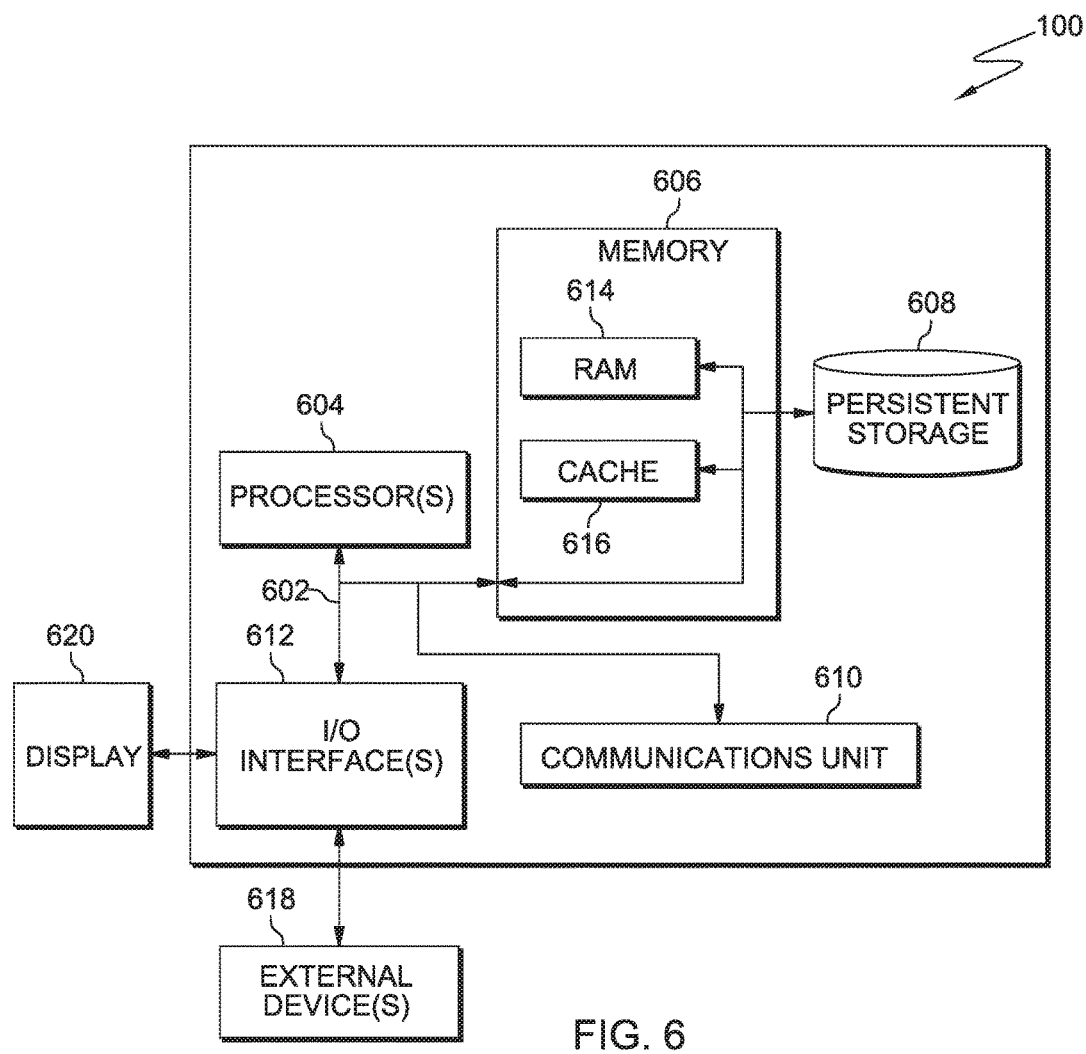
FIG. 6 is a block diagram of the computer system executing the code transformation program, in accordance with an embodiment of the present invention.

FIG. 6 depicts a block diagram of components of computer system 100, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computer system 100 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM) 614 and cache memory 616. In general, memory 606 can include any suitable volatile or non-volatile computer readable storage media.

Code transformation program 102 and code transformation program data 103 are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Code transformation program 102 and code transformation program data 103 may be downloaded to persistent storage 608 through communications unit 610.

I/O interface(s) 612 allows for input and output of data with other devices that may be connected to computer system 100. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention, e.g., code transformation program 102 and code transformation program data 103, can be stored on such portable computer readable storage media and can be loaded onto persistent storage 608 via I/O interface(s) 612. I/O interface(s) 612 also connect to a display 620.

Display 601 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for decreasing an execution time of a computer code, the method comprising:
   identifying, by one or more processors, a long-form conditional branch that is included in a first executed region of a computer code;
   responsive to a determination that the first executed region is executed frequently, determining, by one or more processors, whether the long-form conditional branch in the first executed region of the computer code is infrequently taken; and
   responsive to a determination that the long-form conditional branch is infrequently taken, initiating, by the one or more processors, modification of the long-form conditional branch to be the short-form conditional branch by:
   generating, by the one or more processors, a long-form unconditional branch with a target that is a target of the long-form conditional branch;
   modifying, by the one or more processors, the long-form conditional branch to be a short-form conditional branch;
   inserting, by the one or more processors, the long-form unconditional branch into the computer code within a branch distance of the short-form conditional branch; and
   modifying, by the one or more processors, a target of the short-form conditional branch to be a location of the long-form unconditional branch in the computer code.

2. The method of claim 1, wherein one or more of: (i) the long-form conditional branch is converted into a short-form conditional branch that branches to a trampoline unconditional branch that is inserted into a puddle, wherein the puddle is a group of consecutive trampoline unconditional branches that serve as targets for one or more short-form conditional branches that replace one or more long-form unconditional branches, (ii) the puddle is located immediately following a basic block that cannot transfer control to the puddle, wherein the last instruction in the basic block is an unconditional branch, (iii) the long-form conditional branch is converted into the short-form conditional branch that branches to an unconditional branch that in turn branches to the target of the long-form conditional branch, (iv) the long-form conditional branch is located at an exit point of a first basic block that branches to an entry point of a second basic block, and (v) wherein the first basic block and the second basic block are executed more frequently than an average frequency of execution relative to other basic blocks.

3. The method of claim 1, the method comprising:
   receiving, by the one or more processors, the computer code; and
   determining, by the one or more processors, whether the first executed region of the computer code is executed frequently.

4. The method of claim 1, wherein the inserting, by one or more processors, the long-form unconditional branch into the computer code within a branch distance of the short-form conditional branch comprises:
- selecting, by the one or more processors, a location to insert the long-form unconditional branch in the computer code, wherein the location is within the branch distance of the short-form conditional branch and the location immediately follows an unconditional branch in the computer code; and
- inserting, by the one or more processors, the long-form unconditional branch at the location in the computer code.

5. The method of claim 1, the method comprising:
- executing, by the one or more processors, the computer code; and
- monitoring, by the one or more processors, executed computer code for the first executed region of the computer code.

6. The method of claim 1, the method comprising:
- executing, by the one or more processors, the computer code;
- determining, by the one or more processors, that a first basic block and a second basic block are expected to be executed frequently relative to other basic blocks; and
- monitoring, by the one or more processors, executed computer code for the long-form conditional branch in the first executed region of the computer code, wherein the long-form conditional branch is located at an exit point of the first basic block that branches to an entry point of the second basic block.

7. A computer program product for decreasing an execution time of a computer code, the computer program product comprising:
- one or more computer readable storage media and program instructions stored on the one or more computer readable storage media, the program instructions comprising:
  - program instructions to identify a long-form conditional branch that is included in a first executed region of a computer code;
  - program instructions to respond to a determination that the first executed region is executed frequently by determining whether the long-form conditional branch in the first executed region of the computer code is infrequently taken; and
  - program instructions to respond to a determination that the long-form conditional branch is infrequently taken by initiating modification of the long-form conditional branch to be the short-form conditional branch by executing:
    - program instructions to generate a long-form unconditional branch with a target that is a target of the long-form conditional branch;
    - program instructions to modify the long-form conditional branch to be a short-form conditional branch;
    - program instructions to insert the long-form unconditional branch into the computer code within a branch distance of the short-form conditional branch; and
    - program instructions to modify a target of the short-form conditional branch to be a location of the long-form unconditional branch in the computer code.

8. The computer program product of claim 7, wherein one or more of: (i) the long-form conditional branch is converted into a short-form conditional branch that branches to a trampoline unconditional branch that is inserted into a puddle, wherein the puddle is a group of consecutive trampoline unconditional branches that serve as targets for one or more short-form conditional branches that replace one or more long-form unconditional branches, (ii) the puddle is located immediately following a basic block that cannot transfer control to the puddle, wherein the last instruction in the basic block is an unconditional branch, (iii) the long-form conditional branch is converted into the short-form conditional branch that branches to an unconditional branch that in turn branches to the target of the long-form conditional branch, (iv) the long-form conditional branch is located at an exit point of a first basic block that branches to an entry point of a second basic block, and (v) wherein the first basic block and the second basic block are executed more frequently than an average frequency of execution relative to other basic blocks.

9. The computer program product of claim 7, the program instructions comprising:
- program instructions to receive the computer code; and
- program instructions to determine whether the first executed region of the computer code is executed frequently.

10. The computer program product of claim 7, wherein the program instructions to insert the long-form unconditional branch into the computer code within a branch distance of the short-form conditional branch comprises:
- program instructions to select a location to insert the long-form unconditional branch in the computer code, wherein the location is within the branch distance of the short-form conditional branch and the location immediately follows an unconditional branch in the computer code; and
- program instructions to insert the long-form unconditional branch at the location in the computer code.

11. The computer program product of claim 7, the program instructions comprising:
- program instructions to execute the computer code; and
- program instructions to monitor executed computer code for the first executed region of the computer code.

12. The computer program product of claim 7, the program instructions comprising:
- program instructions to execute the computer code;
- program instructions to determine that a first basic block and a second basic block are expected to be executed frequently relative to other basic blocks; and
- program instructions to monitor executed computer code for the long-form conditional branch in the first executed region of the computer code, wherein the long-form conditional branch is located at an exit point of the first basic block that branches to an entry point of the second basic block.

13. A computer system for decreasing an execution time of a computer code, the computer system comprising:
- one or more computer processors;
- one or more computer readable storage media; and
- program instructions stored on the computer readable storage media for execution by at least one of the one or more processors, the program instructions comprising:
  - program instructions to identify a long-form conditional branch that is included in a first executed region of a computer code;
  - program instructions to respond to a determination that the first executed region is executed frequently by determining whether the long-form conditional branch in the first executed region of the computer code is infrequently taken; and program instructions to respond to a determination that the long-form conditional branch is infrequently taken by initiating modification of the long-form conditional branch to be the short-form conditional branch by executing:

program instructions to generate a long-form unconditional branch with a target that is a target of the long-form conditional branch;

program instructions to modify the long-form conditional branch to be a short-form conditional branch;

program instructions to insert the long-form unconditional branch into the computer code within a branch distance of the short-form conditional branch; and program instructions to modify a target of the short-form conditional branch to be a location of the long-form unconditional branch in the computer code.

14. The computer system of claim 13, wherein one or more of: (i) the long-form conditional branch is converted into a short-form conditional branch that branches to a trampoline unconditional branch that is inserted into a puddle, wherein the puddle is a group of consecutive trampoline unconditional branches that serve as targets for one or more short-form conditional branches that replace one or more long-form unconditional branches, (ii) the puddle is located immediately following a basic block that cannot transfer control to the puddle, wherein the last instruction in the basic block is an unconditional branch, (iii) the long-form conditional branch is converted into the short-form conditional branch that branches to an unconditional branch that in turn branches to the target of the long-form conditional branch, (iv) the long-form conditional branch is located at an exit point of a first basic block that branches to an entry point of a second basic block, and (v) wherein the first basic block and the second basic block are executed more frequently than an average frequency of execution relative to other basic blocks.

15. The computer system of claim 13, the program instructions comprising:

program instructions to receive the computer code; and program instructions to determine whether the first executed region of the computer code is executed frequently.

16. The computer system of claim 13, wherein the program instructions to insert the long-form unconditional branch into the computer code within a branch distance of the short-form conditional branch comprises:

program instructions to select a location to insert the long-form unconditional branch in the computer code, wherein the location is within the branch distance of the short-form conditional branch and the location immediately follows an unconditional branch in the computer code; and program instructions to insert the long-form unconditional branch at the location in the computer code.

17. The computer system of claim 13, the program instructions comprising:

program instructions to execute the computer code;

program instructions to determine that a first basic block and a second basic block are expected to be executed frequently relative to other basic blocks; and program instructions to monitor executed computer code for the long-form conditional branch in the first executed region of the computer code, wherein the long-form conditional branch is located at an exit point of the first basic block that branches to an entry point of the second basic block.

* * * * *